United States Patent
Liu

(10) Patent No.: US 7,203,788 B2
(45) Date of Patent: Apr. 10, 2007

(54) USB-TO-VGA CONVERTER

(75) Inventor: Pei Chung Liu, ChungHo (TW)

(73) Assignee: Magic Control Technology Corporation, Taipei (TW)

(*) Notice: Subject to any disclaimer, the term of this patent is extended or adjusted under 35 U.S.C. 154(b) by 392 days.

(21) Appl. No.: 10/316,013

(22) Filed: Dec. 11, 2002

(65) Prior Publication Data

US 2004/0117538 A1    Jun. 17, 2004

(51) Int. Cl.
*G06F 13/36* (2006.01)

(52) U.S. Cl. ............... 710/315; 710/107; 710/100; 710/305; 710/306

(58) Field of Classification Search ........... 710/315, 710/22, 308, 310, 100, 305–306
See application file for complete search history.

(56) References Cited

U.S. PATENT DOCUMENTS

| | | | |
|---|---|---|---|
| 6,175,789 B1 * | 1/2001 | Beckert et al. | 701/33 |
| 6,202,008 B1 * | 3/2001 | Beckert et al. | 701/33 |
| 6,285,398 B1 * | 9/2001 | Shinsky et al. | 348/223.1 |
| 6,624,797 B1 * | 9/2003 | Wheeler et al. | 345/1.2 |
| 6,629,926 B1 * | 10/2003 | Finger et al. | 600/437 |
| 2001/0032280 A1 * | 10/2001 | Osakada et al. | 710/129 |
| 2002/0135584 A1 * | 9/2002 | Lee | 345/531 |
| 2004/0021615 A1 | 2/2004 | Benson et al. | |
| 2004/0153778 A1 * | 8/2004 | Cheng | 714/25 |

OTHER PUBLICATIONS

Subramaniam, K, "VinChip Announces Release of USB-PCI Device Bridge IP", San Jose, CA.
National Semiconductor, USBN9602 (Universal Serial Bus) Full Speed Function Controller With DMA Support, Nov. 1998.

* cited by examiner

*Primary Examiner*—Rehana Perveen
*Assistant Examiner*—Kim T. Huynh
(74) *Attorney, Agent, or Firm*—Rosenberg, Klein & Lee

(57) ABSTRACT

A USB-to-VGA converter includes a USB controller connectable to a USB port of a computer for receiving USB based display signals from the computer, a VGA controller connectable to a display device for conveying VGA signals to the display device and a bridge connected between the USB controller and the VGA controller. The bridge receives a bus control command from the USB controller and issues a first-in-first-out control signal to the USB controller to receive the USB based display signals from the USB controller in a first-in-first-out manner. The bridge circuit converts the USB based display signals into corresponding VGA signals and forwarding the VGA signals to the VGA controller, which in turn applies the VGA signals to the display device. No display interface card is required inside the host computer for generation of the VGA signals.

19 Claims, 6 Drawing Sheets

USB-TO-VGA CONVERTER

BACKGROUND OF THE INVENTION

1. Field of the Invention

The present invention relates generally to a USB (Universal Serial Bus) to VGA (Video Graphics Array) converter, and in particular to a USB-to-VGA converter connectable between a USB port of a computer and a VGA display device.

2. The Related Art

A computer system comprises a display device connected to a host machine of the computer system for receiving display signals from the host computer and displaying messages associated with the display signals. The connection between the display device and the host computer is provided by an interface circuit built in the host computer, such as a PCI (Peripheral Component Interconnect) display interface and an AGP (Accelerated Graphics Port) display interface. A display interface card is mounted on a main board of the host computer for transmission of VGA signals to the display device. The display interface card occupies a portion of the limited space inside the host computer and in addition, increases the overall costs of the computer system. The display interface card is often connected to the display device by a cable for transmission of the display signals. The cable is adverse to the management of peripheral devices of the computer system and limits the distance that the display signals can be transmitted therethrough.

SUMMARY OF THE INVENTION

Thus, an object of the present invention is to provide a USB-to-VGA converter which converts USB based display signals issued from a host computer into VGA signals that can be received and recognized by a display device whereby image to be displayed can be transmitted from the host computer in USB form.

Another object of the present invention is to provide a USB-to-VGA converter that converts USB based display signals from a host computer into VGA signals in a first-in-first-out manner for display in a VGA display device.

A further object of the present invention is to provide a USB-to-VGA converter that allows for direct transmission of USB signals from a host computer to a display device without adding any display interface card inside the host computer.

To achieve the above objects, in accordance with the present invention, there is provided a USB-to-VGA converter comprising a USB controller connectable to a USB port of a computer for receiving USB based display signals from the computer, a VGA controller connectable to a display device for conveying VGA signals to the display device and a bridge connected between the USB controller and the VGA controller. The bridge receives a bus control command from the USB controller and issues a first-in-first-out control signal to the USB controller to receive the USB based display signals from the USB controller in a first-in-first-out manner. The bridge circuit converts the USB based display signals into corresponding VGA signals and forwarding the VGA signals to the VGA controller, which in turn applies the VGA signals to the display device. No display interface card is required inside the host computer for generation of the VGA signals.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
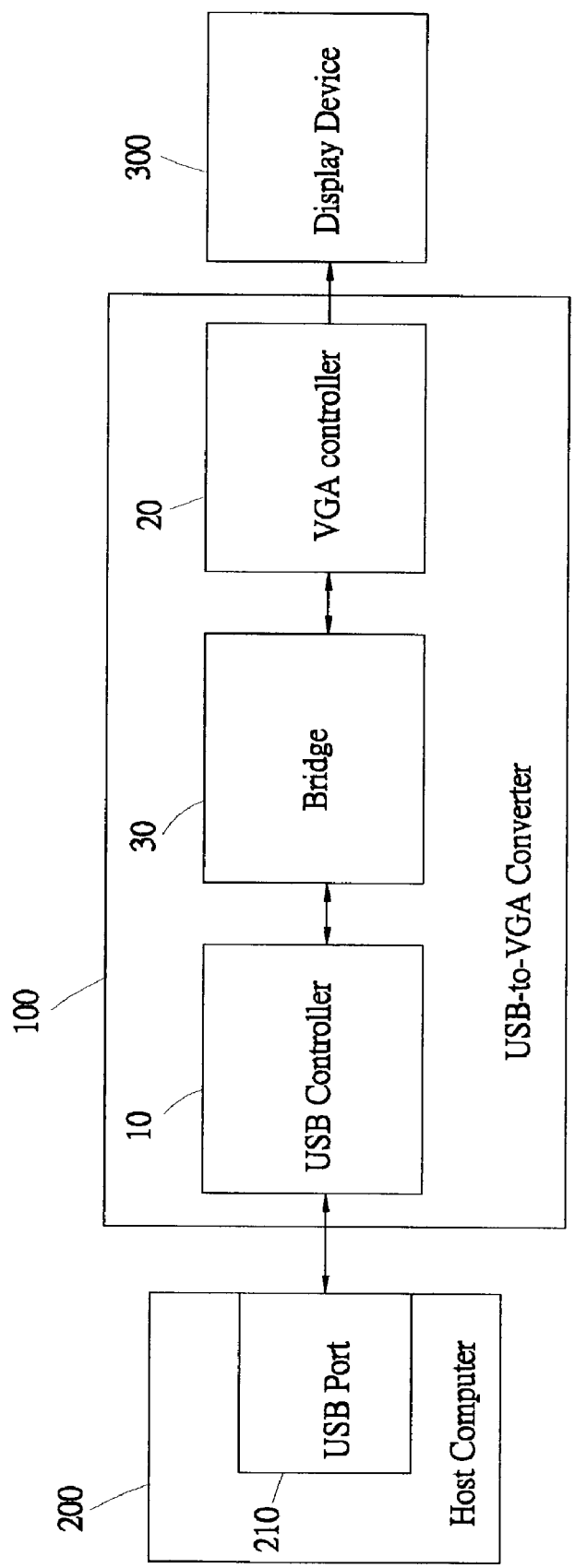
FIG. 1 is a system block diagram of a USB-to-VGA converter constructed in accordance with the present invention.

With reference to the drawings and in particular to FIG. 1, a USB-to-VGA converter constructed in accordance with the present invention, generally designated with reference numeral 100, comprises a USB controller 10, a VGA controller 20 and a bridge 30 connected between the USB controller 10 and the VGA controller 20. The USB controller 10 is connectable to a USB port 210 of a host computer 200 for receiving USB based display signals from the host computer 200. The VGA controller 20 is connectable to a display device 300 whereby the USB-to-VGA converter 100 provides a signal conversion and connection between the host computer 200 and the display device 300.

The bridge 30 that is connected between the USB controller 10 and the VGA controller 20 receives the USB based display signals from the USB controller 10 in a first-in-first-out (FIFO) manner and converts the USB based display signals into corresponding standard VGA signals which is then applied to the VGA controller 20. The VGA controller 20 in turn forwards the VGA signals to the display device 300 for display by the display device 300.

Figure 2:
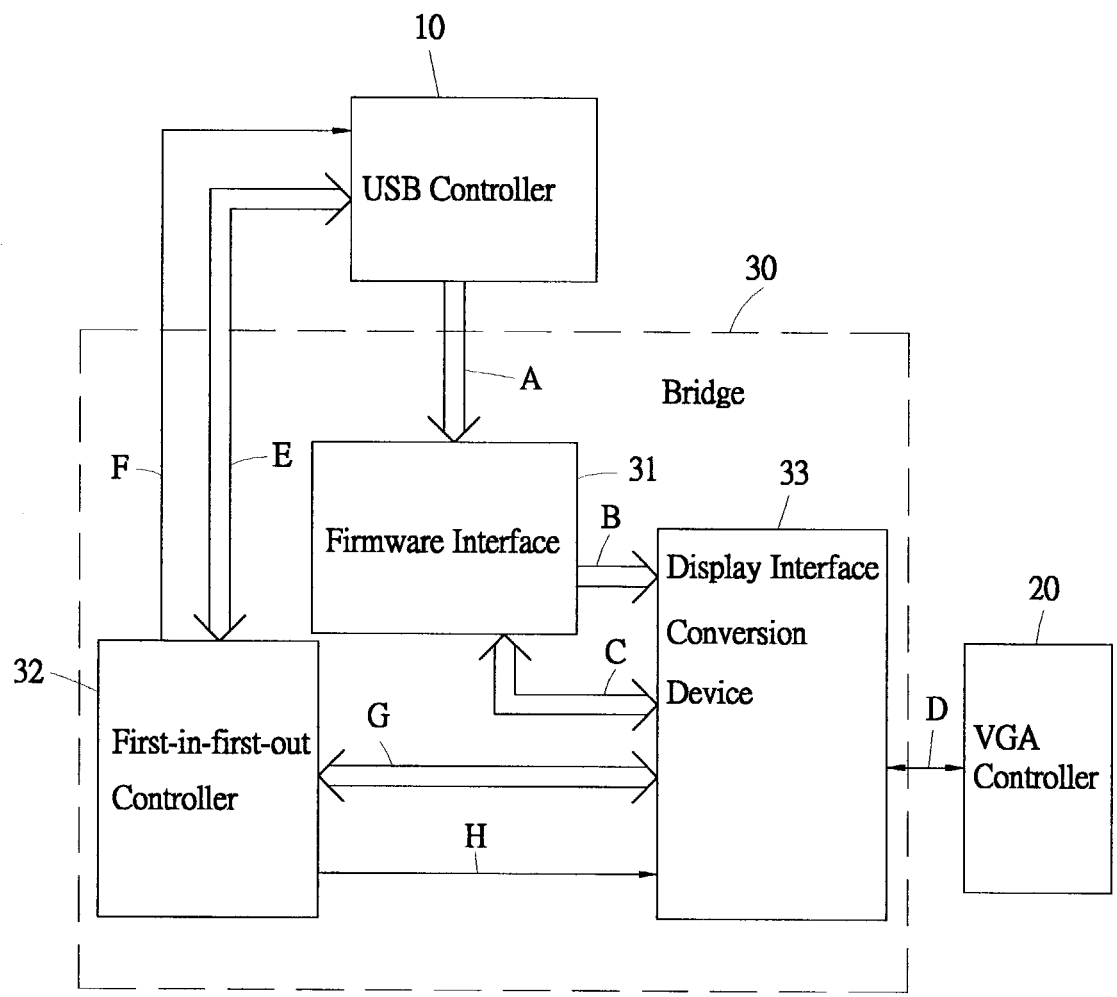
FIG. 2 is a block diagram of a bridge circuit of the USB-to-VGA converter of the present invention.

Also referring to FIG. 2, the bridge 30 comprises a firmware interface 31, a first-in-first-out (FIFO) controller 32 and a display interface conversion device 33. The firmware interface 31 is connected to the USB controller 10 and receives a bus control command A from the USB controller 10. The firmware interface 31 is also connected to the display interface conversion device 33 by a control bus B and a data bus C for transmission of a DMA control signal, a firmware control signal and a control command therebetween for allowing the display interface conversion device 33 to convert the USB based display signals into the corresponding VGA signals D which can be of PCI type or AGP type, but is not limited thereto.

The FIFO controller 32 is connected to the USB controller 10 by a data bus E and a control line F. The FIFO controller 32 issues control instructions to the USB controller 10 via the control line F for controlling the USB controller 10 to forward the USB based display signals received from the host computer 200 to the FIFO controller 32 in a FIFO manner via the data bus E. The FIFO controller 32 is connected to the display interface conversion device 33 by a data bus G and a control line H whereby the FIFO controller 32 issues FIFO control instruction to the display interface conversion device 33 via the control line H in order to convey the USB based display signals from the FIFO controller 32 to the display interface conversion device 33 in a FIFO manner via the data bus G. The display interface conversion device 33 then converts the USB based display signals into the corresponding VGA signals D and applies the VGA signals D to the display device 300.

Figure 3:
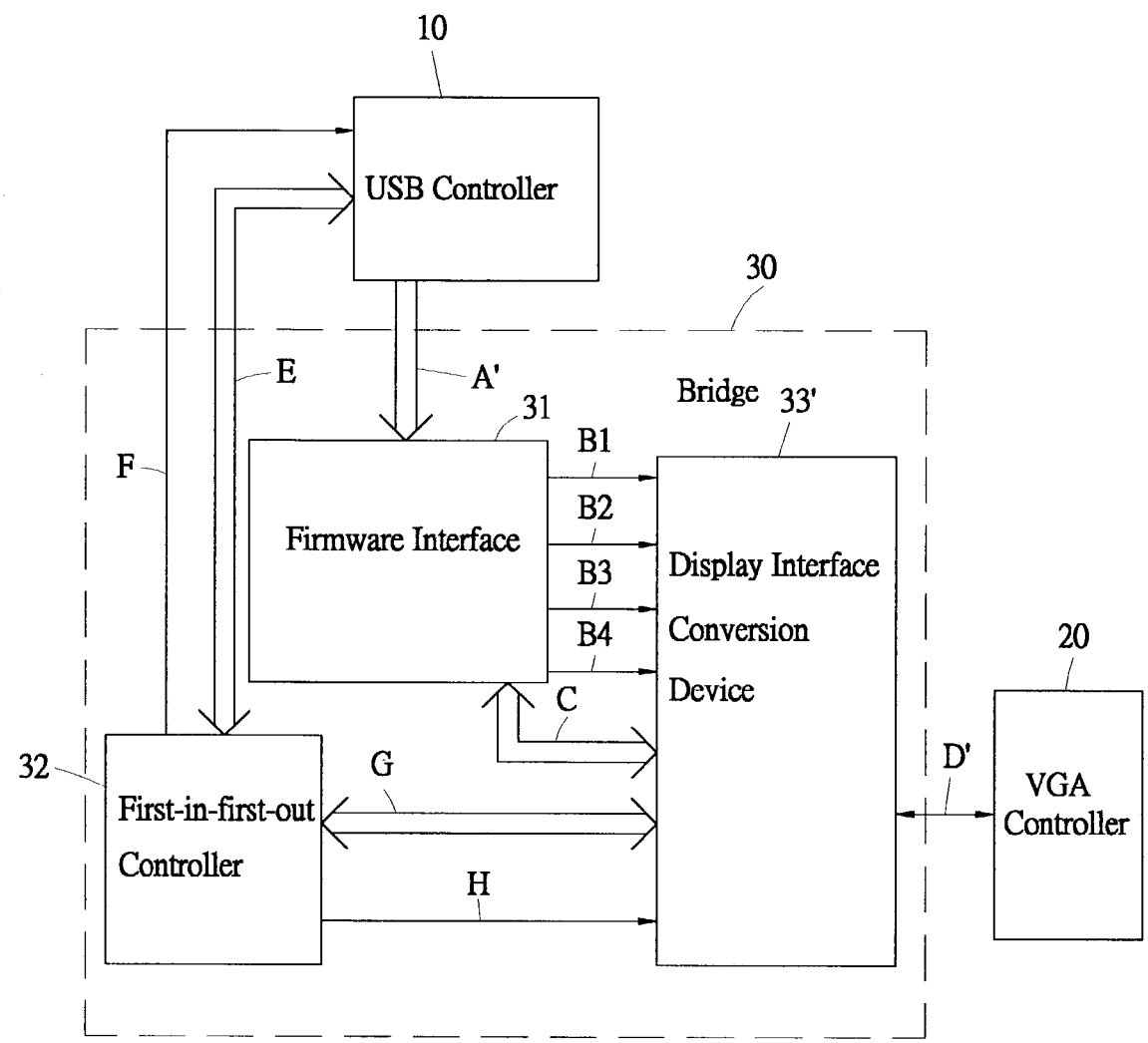
FIG. 3 is a block diagram of a bridge circuit of the USB-to-VGA converter in accordance with a different embodiment of the present invention.

FIG. 3 shows a block diagram of a different embodiment of the bridge 30 in which the display interface conversion device, which is designated with reference numeral 33' for distinction, is embodied as a PCI interface. The firmware interface 31 receives a PIO bus control command A' that is issued by the USB controller 10. The firmware interface 31 is connected to the display interface conversion device 33' by a DMA address control line B1, a DMA length control line B2, a DMA trigger control line B3, a firmware trigger control line B4 and a data bus C whereby the firmware interface 31 controls DMA address, data length and trigger signal of the display interface conversion device 33' and the triggering of the firmware by means of the DMA address control line B1, the DMA length control line B2, the DMA trigger control line B3, and the firmware trigger control line B4 and forwards control instructions and data to the display interface conversion device 33' via the data bus C.

In the embodiment illustrated in FIG. 3, similar to that shown in FIG. 2, the FIFO controller 32 is connected to the USB controller 10 by a data bus E and a control line F. The FIFO controller 32 issues control instructions to the USB controller 10 via the control line F for controlling the USB controller 10 to forward the USB based display signals received from the host computer 200 to the FIFO controller 32 in a FIFO manner via the data bus E. The FIFO controller 32 is connected to the display interface conversion device 33' by a data bus G and a control line H whereby the FIFO controller 32 issues a FIFO control instruction to the display interface conversion device 33' via the control line H in order to convey the USB based display signals from the FIFO controller 32 to the display interface conversion device 33' in a FIFO manner via the data bus G. The display interface conversion device 33', based on the control signals including the DMA address, the data length, the trigger signal and the firmware triggering signal issued by the firmware interface 31 via the DMA address control line B1, the DMA length control line B2, the DMA trigger control line B3 and the firmware trigger control line B4, converts the USB based display signals into the corresponding PCI type VGA signals D' and applies the VGA signals D' to the display device 300.

The bridge 30 comprised of the USB-to-VGA converter of the present invention is embodied in for example a FPGA (Field Programmable Gate Array) chip. However, it can also be embodied in a single chip integrated circuit of different form, such as an ASIC, in which the firmware interface 31, the FIFO controller 32 and the display interface conversion device 33 (33') are integrated.

Figure 4:
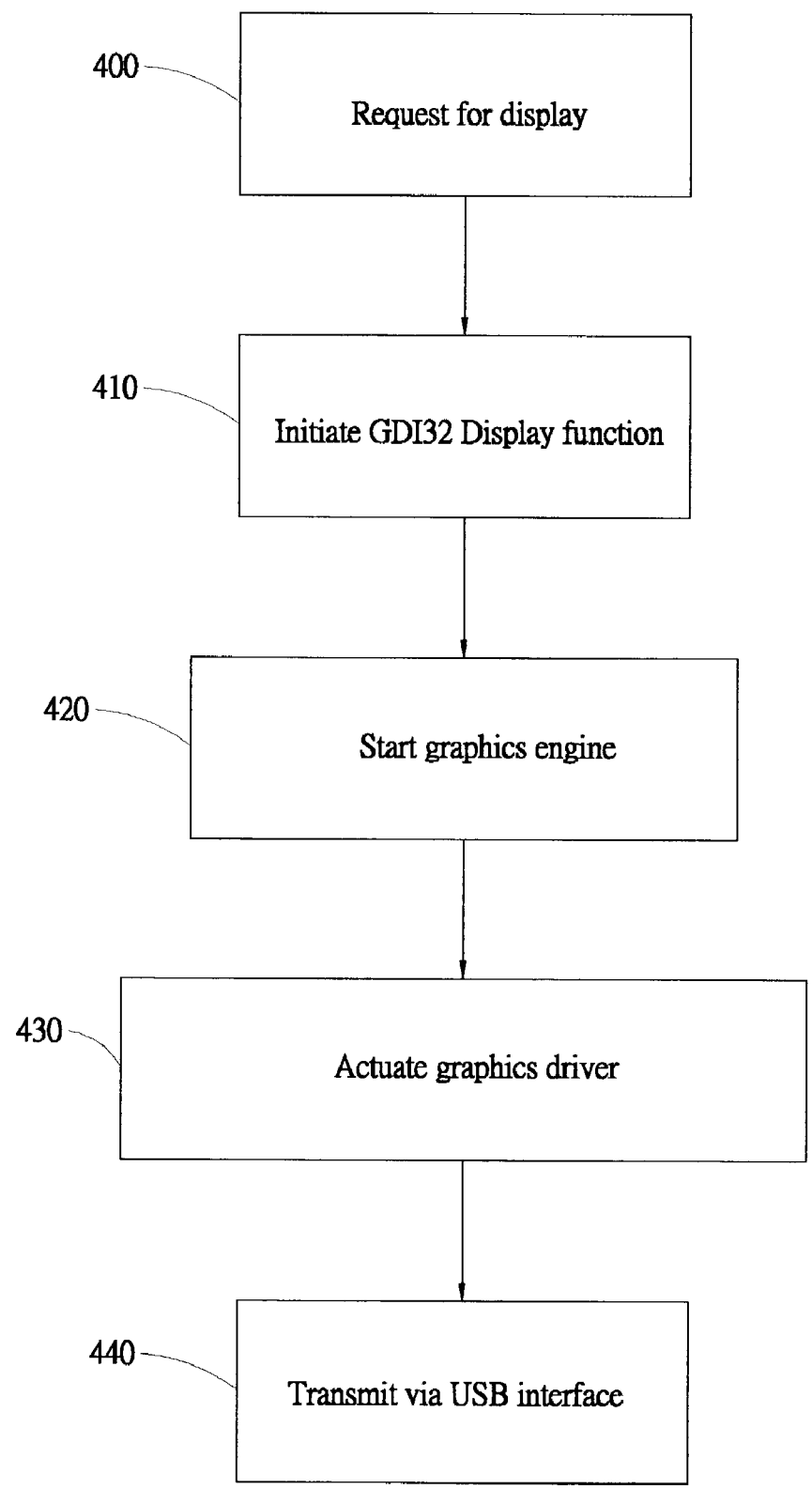
FIG. 4 is a flow chart illustrating a process for a host computer to issue USB display signals to a USB controller.

FIG. 4 shows an operation process of the USB-to-VGA converter 100 working with a host computer 200 to control the display device 300. The operation process discussed herein is based on the WINDOWS operation system released by Microsoft Company, comprising the following steps: In step 400, application software of the host computer 200 issues a request for display of messages. In step 410, the host computer 200 initiates GDI32 display control function and forward the display messages of the application software to a graphics engine. The graphics engine is started in step 420 for processing the messages to be displayed. In step 430, a graphics driver is actuated to process and drive the displayed screen information. In step 440, the information is transmitted via the USB interface.

Based on the above description of the operation process of the USB-to-VGA converter 100, the USB-to-VGA converter 100 can work with any computer systems running under any operation systems. No hardware based display card is required inside the computer 200. The space that is traditionally occupied by the display card inside the computer 200 is thus saved. In addition, no large cable connected between the display device and the host computer is needed.

Figure 5:
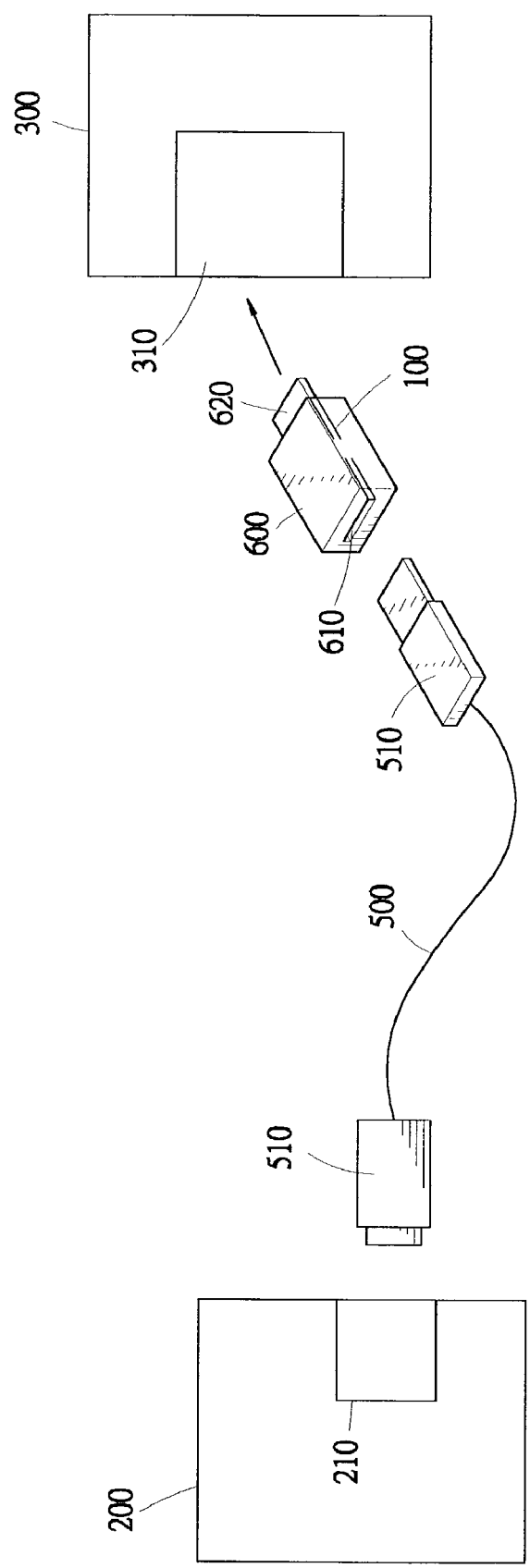
FIG. 5 is a schematic view illustrating an application of the USB-to-VGA converter in connecting a display device to a host computer.

FIG. 5 shows an application of the USB-to-VGA converter of the present invention in a computer system comprising a display device 300 and a host computer 200. The USB-to-VGA converter 100 is encased in and embodied as an "adaptor" 600. In other words, the USB controller 10, the VGA controller 20 and the bridge 30 are arranged inside the adaptor 600. The adaptor 600 forms a VGA plug 620 releasably mating a signal inlet port 310 of the display device 300 and a USB socket 610 into which a USB plug 510 formed on an end of a USB cable 500 is plugged. An opposite end of the USB cable 500 forms another USB plug 510 for engaging a USB port 210 of the host computer 200 thereby connecting the host computer 200 to the display device 300.

Figure 6:
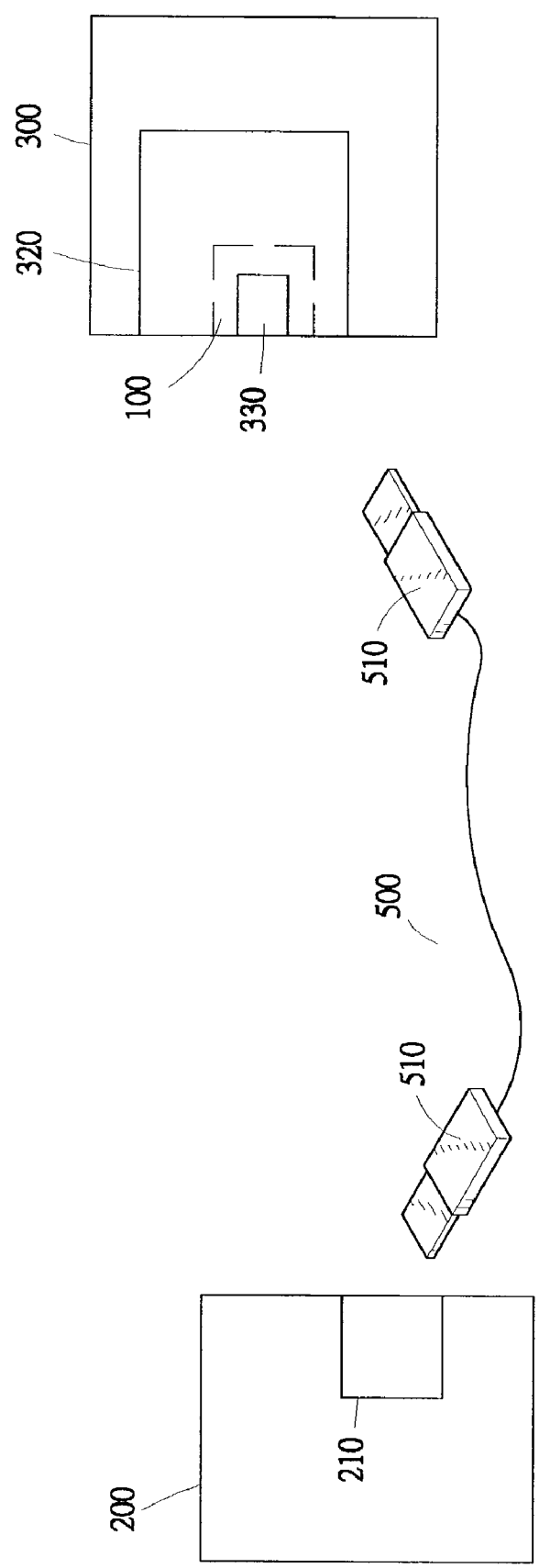
FIG. 6 is a schematic view illustrating a different application of the USB-to-VGA converter in connecting a display device to a host computer.

FIG. 6 shows a different application of the USB-to-VGA converter of the present invention in a computer system comprising a display device 300 and a host computer 200 connected by a USB cable 500. The USB controller 10, the VGA controller 20 and the bridge 30 of the USB-to-VGA converter 100 of the present invention are integrated with a display control circuit 320 built inside the display device 300. The display control circuit 320 comprises a USB socket 330 exposed for engagement with a USB plug 510 formed on an end of the USB cable 500. An opposite end of the USB cable 500 forms another USB plug 510 for engaging a USB port 210 of the host computer 200 thereby connecting the host computer 200 to the display device 300. The VGA controller 20 is coupled to the display control circuit 320 for direct supply of VGA signals to the display device 300.

The present invention is aimed to provide a simple and low cost measure for connecting a host computer to a display device without a hardware based display interface card mounted inside the host computer. A USB cable can simply connect the display device to the host computer and allows for transmission of display signals in USB form that has a broad bandwidth and low signal lose. The USB signal is then converted into a VGA signal for proper display by the display device. Costs of the cable itself and the installation of the cable between the computer and the display device are thus substantially reduced. Flexibility of the arrangement of the display device with respect to the computer is also enhanced.

Although the present invention has been described with reference to the preferred embodiments thereof, it is apparent to those skilled in the art that a variety of modifications and changes may be made without departing from the scope of the present invention which is intended to be defined by the appended claims.

The invention claimed is:

1. A USB-to-VGA converter interconnecting through a USB port of a computer a display device controlled the computer comprising:

a USB controller disposed external to the computer and adapted to detachably connect to a USB port of the computer for receiving exclusively therethrough USB based display signals from the computer, the USB controller issuing a bus control command;

a VGA controller disposed external to the computer and adapted to connect to the display device for conveying VGA signals to the display device; and a bridge disposed external to the computer and connecting the USB controller and the VGA controller one to the other for the passage of data therebetween, the bridge receiving the bus control command and issuing a first-in-first-out control signal to the USB controller to receive the USB based display signals from the USB controller in a first-in-first-out manner, the bridge circuit converting the USB based display signals into corresponding VGA signals and forwarding the VGA signals to the VGA controller which in turn applies the VGA signals to the display device.

2. The USB-to-VGA converter as claimed in claim 1, wherein the USB controller comprises a USB socket.

3. The USB-to-VGA converter as claimed in claim 1, wherein the VGA controller comprises a VGA plug.

4. The USB-to-VGA converter as claimed in claim 1, wherein the converter is encased in an adaptor which comprises a USB socket for connection with the USB port of the computer.

5. The USB-to-VGA converter as claimed in claim 4, wherein the adaptor further comprises a VGA plug for connection with the display device.

6. The USB-to-VGA converter as claimed in claim 1, wherein the USB controller, the bridge circuit and the VGA controller are integrated with a display control circuit built inside the display device.

7. The USB-to-VGA converter as claimed in claim 6, wherein the USB controller comprises a USB socket for connection with the USB port of the computer.

8. The USB-to-VGA converter as claimed in claim 6, wherein the VGA controller is directly connected to the display control circuit of the display device.

9. The USB-to-VGA converter as claimed in claim 1, wherein the bridge circuit comprising:
a firmware interface connected to the USB controller for receiving the bus control signal from the USB controller and issuing a DMA control signal, a firmware control signal and control command data;
a first-in-first-out controller connected to the USB controller for issuing the first-in-first-out control signal to the USB controller to receive the USB based display signals from the USB controller in a first-in-first-out manner; and
a display interface conversion device connected to the firmware interface, the first-in-first-out controller and the VGA controller for receiving the DMA control signal, the firmware control signal and the control command data from the firmware interface and being controlled by the first-in-first-out control signal from the first-in-first-out controller to receive the USB based display signals from the USB controller in a first-in-first-out manner, the display interface conversion device converting the USB based display signals into the corresponding VGA signals and forwarding the VGA signals to the VGA controller.

10. The USB-to-VGA converter as claimed in claim 9, wherein the bus control signal from the USB controller to the firmware interface comprises a PIO bus control signal.

11. The USB-to-VGA converter as claimed in claim 9, wherein the firmware interface is connected to the display interface conversion device by a control bus and a data bus.

12. The USB-to-VGA converter as claimed in claim 9, wherein the firmware interface is connected to the display interface conversion device by a DMA address control line, a DMA length control line, a DMA trigger control line, a firmware trigger control line and a data bus.

13. The USB-to-VGA converter as claimed in claim 9, wherein the first-in-first-out controller is connected to the USB controller by a control line and a data bus.

14. The USB-to-VGA converter as claimed in claim 9, wherein the first-in-first-out controller is connected to the display interface conversion device by a control line and a data bus.

15. The USB-to-VGA converter as claimed in claim 9, wherein the VGA signals comprise PCI type VGA display signals.

16. The USB-to-VGA converter as claimed in claim 9, wherein the firmware interface, the first-in-first-out controller and the display interface conversion device are integrated in a single chip integrated circuit.

17. The USB-to-VGA converter as claimed in claim 16, wherein the integrated circuit comprises a field programmable gate array integrated circuit.

18. The USB-to-VGA converter as claimed in claim 16, wherein the integrated circuit comprises an ASIC integrated circuit.

19. A discrete USB-to-VGA converter externally interconnecting in detachable manner through a USB port of a computer a display device controlled the computer comprising:
a USB controller disposed external to the computer and detachably connected to a USB port of the computer for receiving exclusively therethrough USB based display signals from the computer, the USB controller issuing a bus control command;
a VGA controller disposed external to the computer for connection to the display device for conveying VGA signals to the display device; and
a bridge disposed external to the computer and interconnecting the USB controller and the VGA controller one to the other for the passage of data therebetween, the bridge receiving the bus control command and issuing a first-in-first-out control signal to the USB controller to receive the USB based display signals from the USB controller in a first-in-first-out manner, the bridge circuit converting the USB based display signals into corresponding VGA signals and forwarding the VGA signals to the VGA controller which in turn applies the VGA signals to the display device.

* * * * *